US011316185B2

(12) United States Patent
Baeck et al.

(10) Patent No.: US 11,316,185 B2
(45) Date of Patent: Apr. 26, 2022

(54) FUEL CELL

(71) Applicants: Hyundai Motor Company, Seoul (KR); Kia Motors Corporation, Seoul (KR)

(72) Inventors: Suk Min Baeck, Seongnam-Si (KR); Yong Suk Heo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 107 days.

(21) Appl. No.: 16/824,551

(22) Filed: Mar. 19, 2020

(65) Prior Publication Data
US 2021/0119242 A1 Apr. 22, 2021

(30) Foreign Application Priority Data
Oct. 16, 2019 (KR) .......... 10-2019-0128570

(51) Int. Cl.
*H01M 8/2475* (2016.01)
*H01M 8/04701* (2016.01)
*H01M 8/0432* (2016.01)

(52) U.S. Cl.
CPC ..... *H01M 8/2475* (2013.01); *H01M 8/04365* (2013.01); *H01M 8/04731* (2013.01); *H01M 2250/20* (2013.01)

(58) Field of Classification Search
CPC ......... H01M 8/04365; H01M 8/04731; H01M 8/2475
See application file for complete search history.

(56) References Cited

U.S. PATENT DOCUMENTS

| 6,333,586 B1* | 12/2001 | Polach | H01L 41/04 310/346 |
|---|---|---|---|
| 2003/0134174 A1* | 7/2003 | Akikusa | H01M 8/04007 429/423 |
| 2005/0042493 A1* | 2/2005 | Fujita | H01M 8/2485 429/458 |
| 2006/0051262 A1* | 3/2006 | Park | H01M 8/0618 422/198 |
| 2009/0148731 A1* | 6/2009 | Mills | H01M 8/04216 429/421 |
| 2014/0186730 A1* | 7/2014 | Lee | H01M 8/04067 429/429 |
| 2014/0302415 A1* | 10/2014 | Peterson | B60L 58/31 429/434 |
| 2016/0043420 A1* | 2/2016 | Thampan | H01M 8/04208 429/423 |

FOREIGN PATENT DOCUMENTS

| JP | 2002-050393 A | 2/2002 |
|---|---|---|
| JP | 2006-286592 A | 10/2006 |

* cited by examiner

*Primary Examiner* — Stewart A Fraser
*Assistant Examiner* — Brent C Thomas
(74) *Attorney, Agent, or Firm* — Morgan, Lewis & Bockius LLP

(57) ABSTRACT

A fuel cell may include a cell stack including a plurality of unit cells stacked in a first direction, first and second end plates disposed at corresponding first and second end portions of the cell stack, at least one clamping member coupled to the first and second end plates to clamp the plurality of unit cells in the first direction and configured to generate heat in a response to a control signal, and a controller configured to generate the control signal based on the temperature of the cell stack.

19 Claims, 9 Drawing Sheets

FUEL CELL

CROSS-REFERENCE TO RELATED APPLICATION

The present application claims priority to Korean Patent Application No. 10-2019-0128570, filed on Oct. 16, 2019, the entire contents of which is incorporated herein for all purposes by this reference.

BACKGROUND OF THE INVENTION

Field of the Invention

Embodiments relate to a fuel cell.

Description of Related Art

In general, in a fuel cell for a vehicle, each of a plurality of unit cells generates electrical energy using air supplied to one surface of a polymer electrolyte membrane and hydrogen supplied to the opposite surface (a fuel electrode) of the polymer electrolyte membrane, and supplies the generated electrical energy to a vehicle system. A device configured for clamping a cell stack including a plurality of unit cells stacked on one another includes, for example, an end plate and a clamping bar.

However, the clamping surface pressure of the cell stack varies irregularly depending on the temperature of the cell stack during the operation thereof, which may cause various problems. Therefore, studies for solving the present problem have been conducted.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fuel cell that substantially obviates one or more problems due to limitations and disadvantages of the related art.

An object of embodiments is to provide a fuel cell configured for maintaining the clamping surface pressure of a cell stack at a constant level irrespective of a change in the temperature of the cell stack.

In an exemplary embodiment of the present invention, a fuel cell may include a cell stack including a plurality of unit cells stacked in a first direction thereof, first and second end plates disposed at corresponding first and second end portions of the cell stack, at least one clamping member coupled to the first and second end plates to clamp the plurality of unit cells in the first direction and configured to generate heat in a response to a control signal, and a controller configured to generate the control signal based on the temperature of the cell stack.

For example, the at least one clamping member may include a clamping body, a heat-generating portion disposed to surround the clamping body, and a heat-insulating portion disposed to surround the heat-generating portion.

For example, the clamping body may include a metallic material. For example, the metallic material may include at least one of steel, aluminum, copper, or magnesium.

For example, the heat-generating portion may be disposed between the first end plate and the second end plate in the first direction thereof.

For example, the heat-generating portion may include a surface-shaped or line-shaped resistance pattern.

For example, the amount of heat generated by the resistance pattern may gradually decrease as the distance from the first and second end plates increases. For example, the amount of heat generated by the resistance pattern may decrease linearly or nonlinearly.

For example, the heat-generating portion may include a first heat-generating sector located at the central area of the cell stack in the first direction thereof, and second heat-generating sectors located closer to the first and second end plates than the first heat-generating sector in the first direction thereof. For example, the amount of heat generated by the second heat-generating sectors may be greater than the amount of heat generated by the first heat-generating sector.

For example, the heat-generating portion may include a metal-based material or a ceramic-based material.

For example, the heat-generating portion may have an electrical resistance of 50Ω to 100Ω.

For example, the heat-generating portion may generate heat of 400 W to 1600 W when the operating voltage of the cell stack is 250 V to 400 V.

For example, the heat-generating portion may include a heat-generating body located between the first and second end plates and configured to surround the clamping body, and first and second power connection portions disposed at corresponding first and second end portions of the heat-generating body and configured to be electrically connected to the control signal.

For example, the heat-insulating portion may include at least one of polyimide, polypropylene, or urethane.

For example, the fuel cell may further include a temperature sensor disposed between the clamping body and the heat-generating portion to detect the temperature of the heat-generating portion. For example, the controller may be configured to generate the control signal using the temperature detected by the temperature sensor.

For example, when the temperature of the cell stack is equal to or greater than a predetermined temperature, the controller may be configured to generate the control signal to satisfy the following equation.

$$\alpha_C \times (T_C - T_O) \times L_C = \alpha_F \times (T_F - T_O) \times L_F$$

Here, $\alpha_C$ denotes the thermal expansion coefficient of the cell stack, $T_C$ denotes the temperature of the cell stack, $T_O$ denotes the predetermined temperature, $L_C$ denotes the length of the cell stack in the first direction, $\alpha_F$ denotes the thermal expansion coefficient of the clamping body, $T_F$ denotes the temperature of the clamping body, and $L_F$ denotes the length of the clamping body in the first direction thereof. For example, the predetermined temperature may be 60° C.

For example, the at least one clamping member may include a plurality of clamping members spaced from each other in a second direction, which intersects the first direction thereof. For example, among the plurality of clamping members, the amount of heat generated by a clamping member disposed in the central area of the cell stack in the second direction when viewed in plan may be greater than the amount of heat generated by a clamping member disposed in the peripheral area of the cell stack in the second direction thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
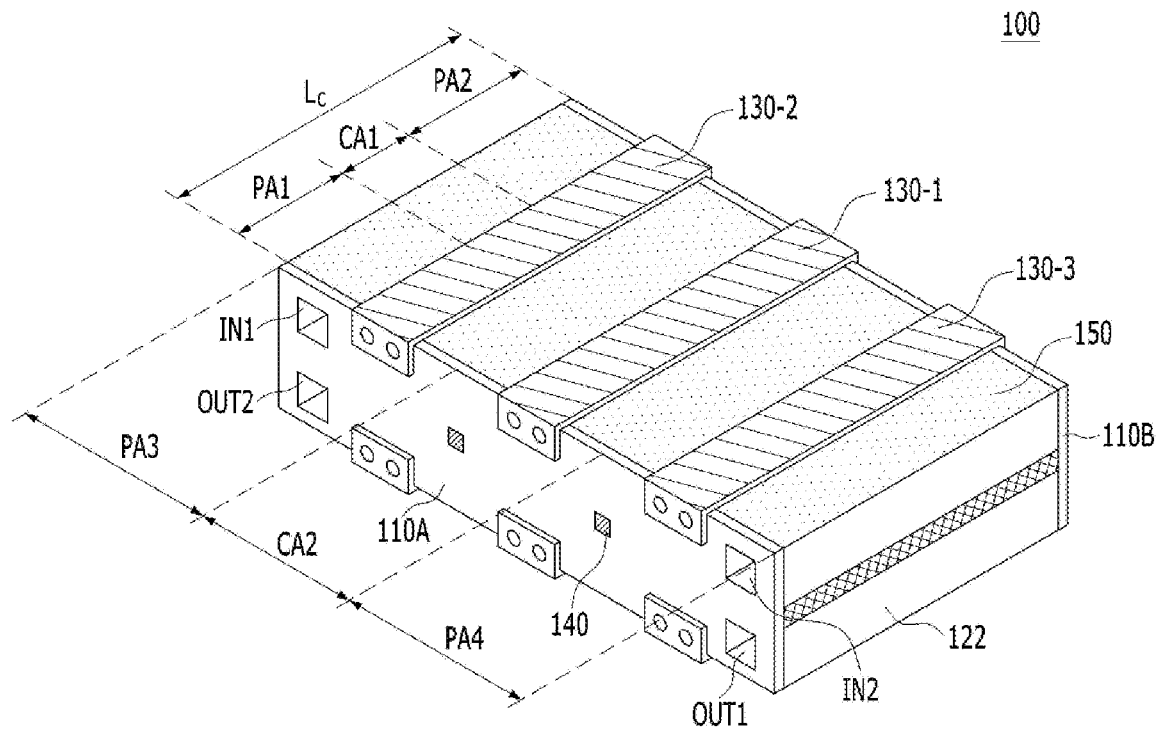
FIG. 1 is a perspective view showing the external appearance of a fuel cell according to an exemplary embodiment of the present invention.
Figure 1:
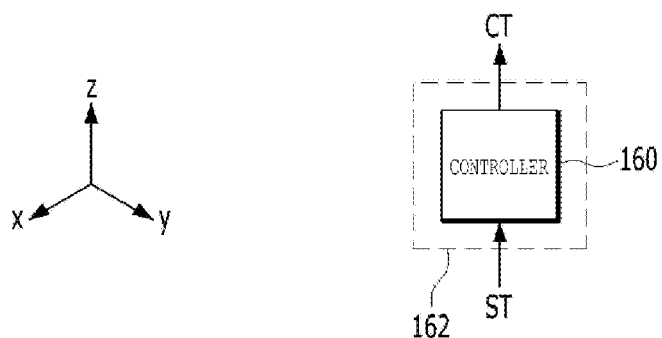

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The present invention will now be described more fully hereinafter with reference to the accompanying drawings, in which various embodiments are shown. The examples, however, may be embodied in various forms and may not be construed as being limited to the exemplary embodiments set forth herein. Rather, these embodiments are provided so that the present disclosure will be more thorough and complete, and will more fully convey the scope of the present invention to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

Furthermore, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell 100 according to embodiments will be described with reference to the accompanying drawings. The fuel cell 100 will be described using the Cartesian coordinate system (x-axis, y-axis, z-axis) for convenience of description. However, other different coordinate systems may be used. In the drawings, the x-axis, the y-axis, and the z-axis of the Cartesian coordinate system are perpendicular to each other. However, the exemplary embodiment is not limited thereto. That is, the x-axis, the y-axis, and the z-axis may intersect each other.

Figure 2:
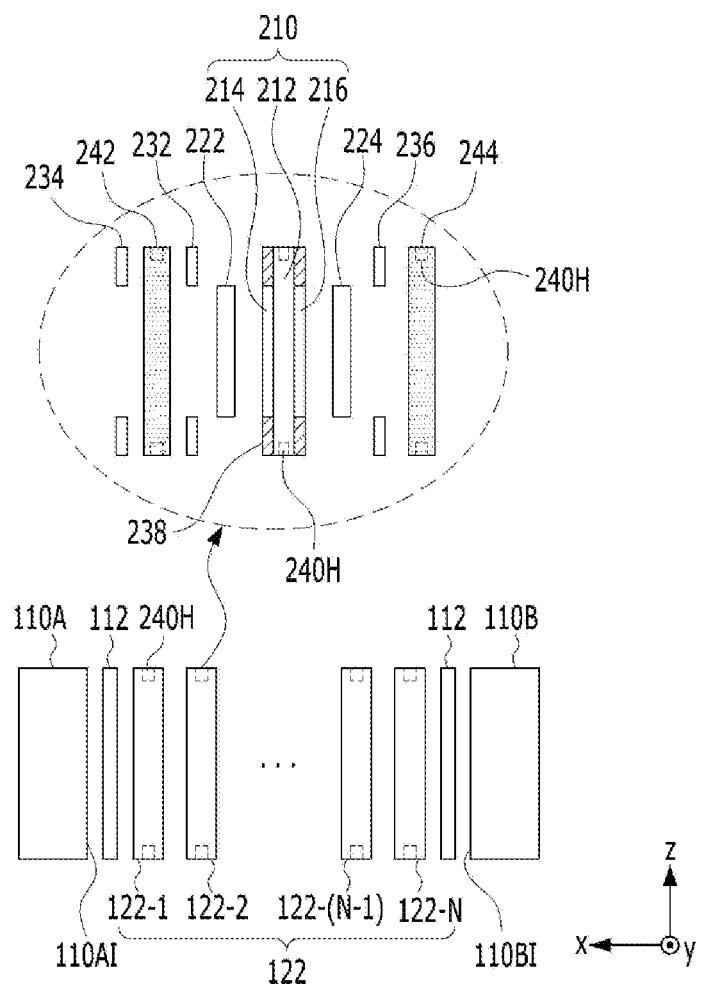
FIG. 2 is a cross-sectional view of the fuel cell shown in FIG. 1.

FIG. 1 is a perspective view showing the external appearance of the fuel cell 100 according to an exemplary embodiment of the present invention, and FIG. 2 is a cross-sectional view of the fuel cell 100 shown in FIG. 1. An illustration of the clamping member 130 (130-1 to 130-3) shown in FIG. 1 is omitted from FIG. 2 for convenience of description.

The fuel cell 100 may be, for example, a polymer electrolyte membrane fuel cell (or a proton exchange membrane fuel cell) (PEMFC), which has been studied most extensively as a power source for driving vehicles. However, the exemplary embodiment is not limited to any specific form of the fuel cell.

The fuel cell 100 according to the exemplary embodiment may include end plates (pressing plates or compression plates) 110A and 110B, a cell stack 122, and at least one clamping member.

Referring to FIG. 2, the cell stack 122 may include a plurality of unit cells 122-1 to 122-N, which are stacked in a first direction (e.g., the x-axis direction). Here, "N" is a positive integer of 1 or greater, and may range from several tens to several hundreds. "N" may range, for example, from 100 to 300, and may preferably be 220. However, the exemplary embodiment is not limited to any specific value of "N".

Each unit cell 122-$n$ (where $1 \leq n \leq N$) may generate 0.6 volts to 1.0 volts of electricity, on average 0.7 volts of electricity. Thus, "N" may be determined in accordance with the intensity of the power to be supplied from the fuel cell 100 to a load. Here, "load" may refer to a part of a vehicle that requires power.

Each unit cell 122-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. The membrane electrode assembly 210 may include a polymer electrolyte membrane (or a proton exchange membrane) 212, a fuel electrode (a hydrogen electrode or an anode) 214, and an air electrode (an oxygen electrode or a cathode) 216.

Furthermore, the membrane electrode assembly 210 may further include a sub-gasket 238.

The polymer electrolyte membrane 212 is disposed between the fuel electrode 214 and the air electrode 216.

Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the gas diffusion layers 222 and 224 and the separators 242 and 244, which are conductors. To realize the above operation, a catalyst layer may be applied to each of the fuel electrode 214 and the air electrode 216. The movement of the electrons described above causes the electrons to flow through an external wire, thus generating current. That is, the fuel cell 100 may generate power due to the electrochemical reaction between hydrogen, which is the fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water (hereinafter, referred to as "condensate water" or "product water"). The condensate water generated in the air electrode 216 in the present manner may penetrate the polymer electrolyte membrane 212 and may be transferred to the fuel electrode 214.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 are configured to uniformly distribute hydrogen and oxygen, which are reactant gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 is configured to diffuse and uniformly distribute hydrogen, supplied as a reactant gas, through the first separator 242, and may be electrically conductive. The second gas diffusion layer 224 is configured to diffuse and uniformly distribute air supplied as a reactant gas through the second separator 244, and may be electrically conductive. Each of the first and second gas diffusion layers 222 and 224 may be a microporous layer in which fine carbon fibers are combined. However, the exemplary embodiment is not limited to any specific configuration of the first and second gas diffusion layers 222 and 224.

The gaskets 232, 234 and 236 is configured to maintain the airtightness and clamping pressure of the cell stack at an appropriate level with respect to the reactant gases and the coolant, to disperse the stress when the separators 242 and 244 are stacked, and to independently seal the flow paths. Accordingly, since airtightness and watertightness are maintained by the gaskets 232, 234 and 236, the flatness of the surfaces that are adjacent to the cell stack 122, which generates power, may be secured, and thus surface pressure may be distributed uniformly over the reaction surface of the cell stack 122.

The separators 242 and 244 is configured to move the reactant gases and the cooling medium and to separate each of the unit cells from the other unit cells. Furthermore, the separators 242 and 244 is configured to structurally support the membrane electrode assembly 210 and the gas diffusion layers 222 and 224 and to collect the generated current and transfer the collected current to the current collectors 112.

The separators 242 and 244 may be disposed outside the gas diffusion layers 222 and 224, respectively. That is, the first separator 242 may be disposed on the left side of the first gas diffusion layer 222, and the second separator 244 may be disposed on the right side of the second gas diffusion layer 224. The first separator 242 is configured to supply hydrogen as a reactant gas to the fuel electrode 214 through the first gas diffusion layer 222. The second separator 244 is configured to supply air as a reactant gas to the air electrode 216 through the second gas diffusion layer 224. Furthermore, each of the first and second separators 242 and 244 may form a channel through which a cooling medium (e.g., coolant) may flow.

Each of the first and second end plates 110A and 110B may be disposed at a respective one of both end portions of the cell stack 122, and may support and fix the unit cells. That is, the first end plate 110A may be disposed at one end portion of the cell stack 122, and the second end plate 110B may be disposed at the opposite end portion of the cell stack 122.

In an exemplary embodiment of the present invention, the first end plate 110A may include a plurality of manifolds (or communication portions) IN1, IN2, OUT1, and OUT2.

Reactant gas required for the membrane electrode assembly 210 may be introduced through the first and second inflow communication portions IN1 and IN2, and gas or liquid to which reactant gas, which is humidified and supplied, and condensate water generated in the cell are added may be discharged outside the fuel cell 100 through the first and second outflow communication portions OUT1 and OUT2. Furthermore, although not shown in the drawings, the second end plate 110B may include a plurality of manifolds (or communication portions) IN3 and OUT3. A cooling medium may be introduced into the cell stack 122 from the outside through the third inflow communication portion IN3, and the cooling medium may be discharged outside from the interior of the cell stack 122 through the third outflow communication portion OUT3.

In another exemplary embodiment of the present invention, unlike the configuration shown in FIG. 1, the first end plate 110A may include a plurality of manifolds (or communication portions) IN1, IN2, IN3, OUT1, OUT2, and OUT3. In the instant case, the first and second inflow communication portions IN1 and IN2 and the first and second outflow communication portions OUT1 and OUT2 may be the same as illustrated in FIG. 1, the third inflow communication portion IN3 may be mounted between the first inflow communication portion IN1 and the second outflow communication portion OUT2 in the first end plate 110A, and the third outflow communication portion OUT3 may be disposed between the second inflow communication portion IN2 and the first outflow communication portion OUT1 in the first end plate 110A.

The current collectors 112 may be disposed between the cell stack 122 and the internal surfaces 110AI and 110BI of the first and second end plates 110A and 110B that are opposite to the cell stack 122. The current collectors 112 are configured to collect electrical energy generated by the flow of electrons in the cell stack 122 and to supply the electrical energy to a load of a vehicle that utilizes the fuel cell 100. Here, the current collectors 112 may be connected to a current-collecting terminal 140.

The at least one clamping member 130 is coupled to the first and second end plates 110A and 110B to clamp the plurality of unit cells in the first direction thereof. In the state in which an appropriate load (or compression force) is applied to the plurality of unit cells repeatedly stacked on one another using a clamping device, the cell stack 122 including the plurality of unit cells is clamped using the clamping member 130. Thus, the external structure of the cell stack 122 may be maintained by the compressive clamping force applied in the direction in which the plurality of unit cells is stacked. To this end, as shown in FIG. 1, the clamping member 130 may connect the first end plate 110A and the second end plate 110B to each other and may be connected to the sides along the major axis of the first and second end plates 110A and 110B and to the sides along the major axis of the separators 242 and 244. The force of clamping the cell stack 122 is maintained by repulsive force between the components that are repeatedly disposed to form the plurality of unit cells of the cell stack 122, securing airtightness/watertightness performance and facilitating transfer of the generated power through the electrical contact between the repeatedly disposed components.

The at least one clamping member 130 may include a plurality of clamping members, which are spaced from each other in a second direction (e.g., the y-axis direction), which intersects the first direction (e.g., the x-axis direction). Although it is illustrated in FIG. 1 that the at least one clamping member 130 includes first to third clamping members 130-1, 130-2 and 130-3 spaced from each other in the second direction (e.g., the y-axis direction), the exemplary embodiment is not limited thereto. In another exemplary embodiment of the present invention, unlike the configuration shown in FIG. 1, the at least one clamping member 130 may include two or four or more clamping members, which are spaced from each other in the second direction (e.g., the y-axis direction).

For example, as shown in FIG. 1, the clamping member 130 may be formed in a bar shape, but the exemplary embodiment is not limited thereto. In another exemplary embodiment of the present invention, the clamping member 130 may be formed in a long bolt shape, a belt shape, or a rigid rope shape to clamp the unit cells.

The fuel cell 100 may further include an insulating plate 150. The insulating plate 150 is disposed between the cell stack 122 and the clamping member 130, and is configured to electrically insulate the cell stack 122 and the clamping member 130 from each other.

In the separators 242 and 244 having an uneven structure, portions thereof that contact with the gas diffusion layers 222 and 224 are referred to as lands, and portions thereof that serve as passages for reactant gas without contacting with the gas diffusion layers 222 and 224 are referred to as channels. The lands of the separators 242 and 244 contact with the gas diffusion layers 222 and 224 to transfer surface pressure, and the channels and the lands of each of the separators 242 and 244 contact each other to transfer surface pressure. In the fuel cell 100, the mechanical structure of the cell stack 122 may be maintained by the surface pressure transfer structure of the reaction surfaces and the gaskets 232, 234 and 236, and the surface pressure of the reaction surfaces may be determined by the support structure of the gas diffusion layers 222 and 224 and the lands of the separators 242 and 244.

Hereinafter, the configuration of the fuel cell 100 according to the exemplary embodiment in which the clamping surface pressure applied to the cell stack 122 is adjusted according to a change in the temperature of the cell stack 122 will be described. For convenience of description, the at least one clamping member 130 will be referred to as including the first to third clamping members 130-1, 130-2 and 130-3, as shown in FIG. 1. However, the following description may also be applied to a configuration in which the at least one clamping member 130 includes two or four or more clamping members.

Figure 3A:
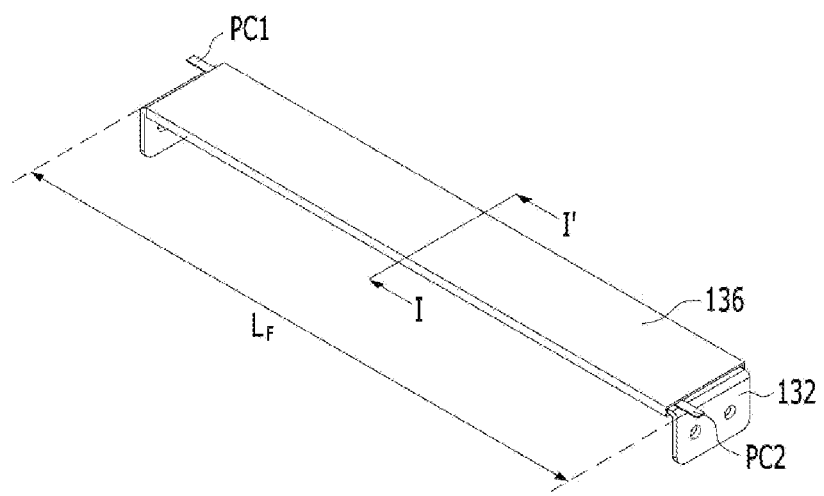
FIG. 3A is a perspective view of a clamping member according to an exemplary embodiment of the present invention.
Figure 3A:
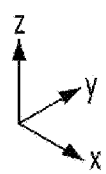
Figure 3B:
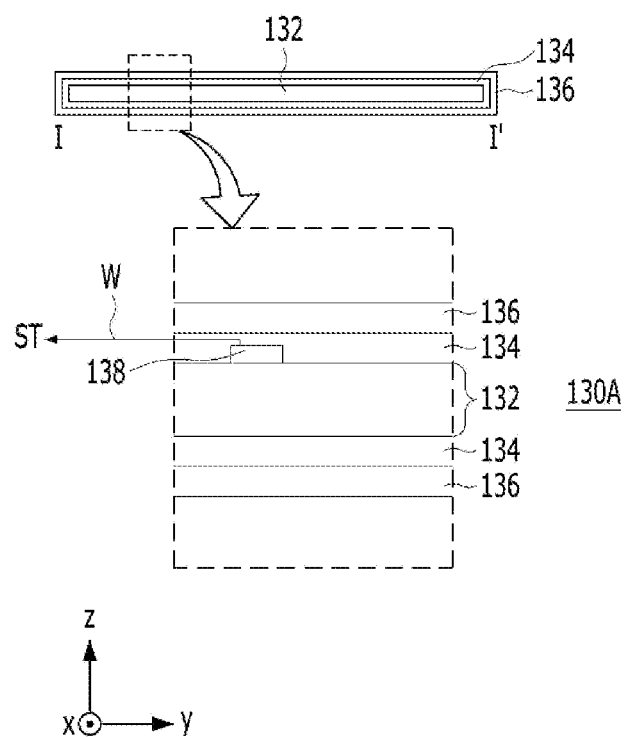
FIG. 3B is a cross-sectional view taken along line I-I' of the clamping member shown in FIG. 3A.

FIG. 3A is a perspective view of a clamping member 130A according to an exemplary embodiment of the present invention, and FIG. 3B is a cross-sectional view taken along line I-I' of the clamping member 130A shown in FIG. 3A.

The clamping member 130A shown in FIG. 3A and FIG. 3B may correspond to an example of each of the first to third clamping members 130-1 to 130-3 shown in FIG. 1.

The fuel cell 100 according to the exemplary embodiment may further include a controller 160. The controller 160 generates a control signal CT according to a change in the temperature of the cell stack 122, and outputs the generated control signal CT to the clamping member 130A.

In the case in which the fuel cell 100 according to the exemplary embodiment is used in a vehicle, the controller 160 may be included in a junction box 162 of the vehicle, but the exemplary embodiment is not limited thereto. The junction box 162 is configured to distribute power generated in the cell stack 122 of the fuel cell 100. For example, the junction box 162 may include a fuse and a relay to control peripheral auxiliary components (balance-of-plant (BOP)) assisting in the operation of the fuel cell 100. In one example, the junction box 162 may be disposed on the fuel cell 100.

The clamping member 130A according to the exemplary embodiment may generate heat in a response to the control signal CT output from the controller 160. To this end, the clamping member 130A may include a clamping body 132, a heat-generating portion 134, and a heat-insulating portion 136.

The clamping body 132 may include a metallic material. For example, the metallic material may include at least one of steel, aluminum, copper, or magnesium. However, the exemplary embodiment is not limited as to the specific metallic material of the clamping body 132. The clamping body 132 may be formed of a metallic material having a high thermal expansion coefficient.

The heat-generating portion 134 may be disposed to surround the clamping body 132.

Figure 4A:
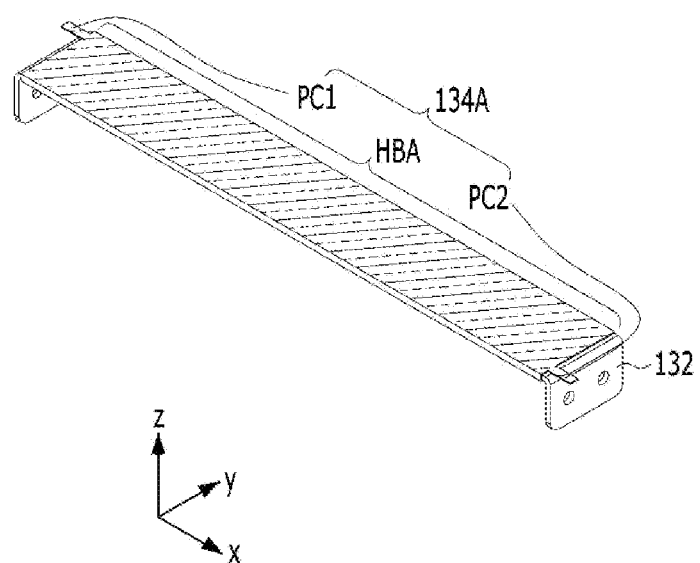
FIG. 4A is a perspective view of a clamping member according to another exemplary embodiment of the present invention.
Figure 4B:
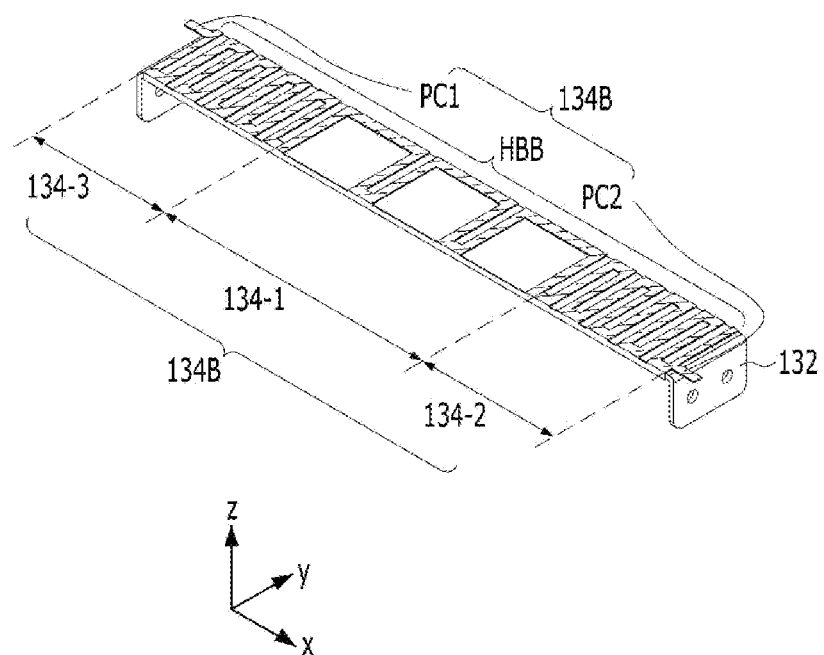
FIG. 4B is a perspective view of a clamping member according to yet another exemplary embodiment of the present invention.

FIG. 4A is a perspective view of a clamping member 130B according to another exemplary embodiment of the present invention, and FIG. 4B is a perspective view of a clamping member 130C according to yet another exemplary embodiment of the present invention. To promote an understanding of Examples 134A and 134B of the heat-generating portion 134 shown in FIG. 3B, an illustration of the heat-insulating portion 136 is omitted from FIG. 4A and FIG. 4B. The clamping members shown in FIG. 4A and FIG. 4B correspond to examples of the clamping member 130A shown in FIG. 3A and FIG. 3B.

The heat-generating portion 134 shown in FIG. 3B may be disposed between the first end plate 110A and the second end plate 110B in the first direction (e.g., the x-axis direction).

The heat-generating portion 134 may have a surface-shaped resistance pattern 134A, as shown in FIG. 4A, or may have a line-shaped resistance pattern 134B, as shown in FIG. 4B.

Furthermore, the amount of heat generated by the resistance pattern of the heat-generating portion 134 may gradually decrease as the distance from the first and second end plates 110A and 110B increases. For example, the amount of heat generated by the resistance pattern of the heat-generating portion 134 may decrease linearly or nonlinearly as the distance from each of the first and second end plates 110A and 110B increases. FIG. 4B illustrates an example in which the amount of heat generated by the resistance pattern of the heat-generating portion 134B decreases nonlinearly as the distance from the first and second end plates 110A and 110B increases.

The heat-generating portion 134B shown in FIG. 4B may include a first heat-generating sector 134-1 and second heat-generating sectors 134-2 and 134-3.

The first heat-generating sector 134-1 may be located at a first central area CA1 of the cell stack 122 in the first direction (e.g., the x-axis direction). The second heat-generating sectors 134-2 and 134-3 may be located closer to the first and second end plates 110A and 110B than the first heat-generating sector 134-1 in the first direction (e.g., the x-axis direction). That is, the second heat-generating sectors 134-2 and 134-3 may be located at first and second peripheral areas PA1 and PA2 of the cell stack 122 in the first direction (e.g., the x-axis direction). Here, the first peripheral area PA1 is an area between the first central area CA1 of the cell stack 122 and the first end plate 110A when viewed in plan. The second peripheral area PA2 is an area between the first central area CA1 of the cell stack 122 and the second end plate 110B when viewed in plan.

In the instant case, the amount of heat generated by the second heat-generating sectors 134-2 and 134-3 may be greater than the amount of heat generated by the first heat-generating sector 134-1. In general, heat loss due to heat conduction of the clamping member 130 at the first and second peripheral areas PA1 and PA2, which are adjacent to both end portions of the first and second end plates 110A and 110B, is greater than that at the first central area CA1. Therefore, it is possible to compensate for the present heat loss by making the amount of heat generated by the second heat-generating sectors 134-2 and 134-3 greater than the amount of heat generated by the first heat-generating sector 134-1.

Furthermore, according to the exemplary embodiment of the present invention, the heat-generating portion 134 may include a heat-generating body HBA or HBB and first and second power connection portions PC1 and PC2. For example, referring to FIG. 4A and FIG. 4B, the heat-generating body HBA or HBB may be located between the first end plate 110A and the second end plate 110B in the first direction (e.g., the x-axis direction), and may surround the clamping body 132. The first and second power connection portions PC1 and PC2 may be disposed at respective end portions of the heat-generating body HBA or HBB, and may be electrically connected to a control signal CT generated from the controller 160. That is, the control voltage generated by the controller 160 may be applied to the first and second power connection portions PC1 and PC2 as the control signal CT. To this end, the controller 160 and the first and second power connection portions PC1 and PC2 may be connected to each other via wires.

The heat-generating portion 134 may include a metal-based material or a ceramic-based material.

Furthermore, the heat-generating portion 134 may have an electrical resistance of 50Ω to 100Ω. The heat-generating portion 134 may generate heat of 400 W to 1600 W when the operating voltage of the cell stack 122 is 250 V to 400 V.

The heat-insulating portion 136 may be disposed to surround the heat-generating portion 134. For example, the heat-insulating portion 136 may include at least one of polyimide (PI), polypropylene (PP), or urethane. The heat-insulating portion 136 may realize thermal separation (i.e., heat insulation) between the cell stack 122 and the heat-generating portion 134.

When the temperature $T_C$ of the cell stack 122 is equal to or greater than a predetermined temperature $T_O$, the controller 160 may generate a control signal CT to satisfy the following Equation 1.

$$\alpha_C \times (T_C - T_O) \times L_C = \alpha_F \times (T_F - T_O) \times L_F \qquad \text{[Equation 1]}$$

Here, $\alpha_C$ denotes the thermal expansion coefficient of the cell stack 122 (or the unit cell 122-$n$), $L_C$ denotes the length of the cell stack 122 in the first direction (e.g., the x-axis direction), $\alpha_F$ denotes the thermal expansion coefficient of the clamping body 132, $T_F$ denotes the temperature of the clamping body 132, and $L_F$ denotes the length of the clamping body 132 in the first direction (e.g., the x-axis direction). For example, the predetermined temperature $T_O$ may be 60° C.

Furthermore, the fuel cell 100 according to the exemplary embodiment may further include a temperature sensor 138. The temperature sensor 138 may detect the temperature of the heat-generating portion 134 and may output the detected temperature ST to the controller 160 through the wire W. To this end, the temperature sensor 138 may be disposed between the clamping body 132 and the heat-generating portion 134. For example, as shown in FIG. 3B, the temperature sensor 138 may be disposed between the clamping body 132 and the heat-generating portion 134, and may be disposed on the clamping body 132.

The temperature sensor 138 may preferably be disposed in the area that vertically overlaps the first central area CA1 of the cell stack 122, rather than the area that vertically overlaps the first or second peripheral area PA1 or PA2 of the cell stack 122. However, when the temperature sensor 138 is disposed in the area that vertically overlaps the first central area CA1, the length of the wire W may increase. Therefore, the temperature sensor 138 may alternatively be disposed in the area that vertically overlaps the first or second peripheral area PA1 or PA2.

The controller 160 may generate a control signal CT based on the temperature ST detected by the temperature sensor 138. Accordingly, the controller 160 may generate a control signal CT to control the amount of heat generated by the clamping member 130 (130-1 to 130-3) and the temperature of the clamping member according to the operation conditions (e.g., the operating temperature) of the cell stack 122.

Furthermore, according to the exemplary embodiment of the present invention, in the case in which a plurality of clamping members is provided, the amount of heat generated by the clamping member which is disposed in a second central area CA2 of the cell stack 122 in the second direction (e.g., the y-axis direction), which intersects the first direction (e.g., the x-axis direction), when viewed in plan may be greater than the amount of heat generated by the clamping member which is disposed in a third or fourth peripheral area PA3 or PA4 of the cell stack 122 in the second direction (e.g., the y-axis direction). Referring to FIG. 1, the first clamping member 130-1 disposed in the second central area CA2 of the cell stack 122 may generate a larger amount of heat than the second and third clamping members 130-2 and 130-3 disposed in the third and fourth peripheral areas PA3 and PA4 of the cell stack 122.

In general, the compression repulsive force in the second central area CA2 of the cell stack 122 is greater than the compression repulsive force in the third and fourth peripheral areas PA3 and PA4 of the cell stack 122. Therefore, in the fuel cell 100 according to the exemplary embodiment of the present invention, the amount of heat generated by the first clamping member 130-1, which is disposed in the area of the cell stack that has larger compression repulsive force, is greater than the amount of heat generated by the second and third clamping members 130-2 and 130-3, which are disposed in the area of the cell stack that has smaller compression repulsive force. Thus, when the cell stack 122 expands at a high temperature, the greater compression repulsive force applied to the components disposed in the second central area CA2 of the cell stack 122 may be offset by the first clamping member 130-1, which expands further than the second and third clamping members 130-2 and 130-3. As a result, although the compression repulsive force in the second central area CA2 and the compression repulsive force in the third and fourth peripheral areas PA3 and PA4 are different from each other, clamping surface pressure may not be intensively applied to the components disposed in the second central area CA2 and the third and fourth peripheral areas PA3 and PA4, but may be evenly applied thereto.

Hereinafter, a fuel cell according to a comparative example and the fuel cell according to the exemplary embodiment will be described with reference to the accompanying drawings.

Figure 5A:
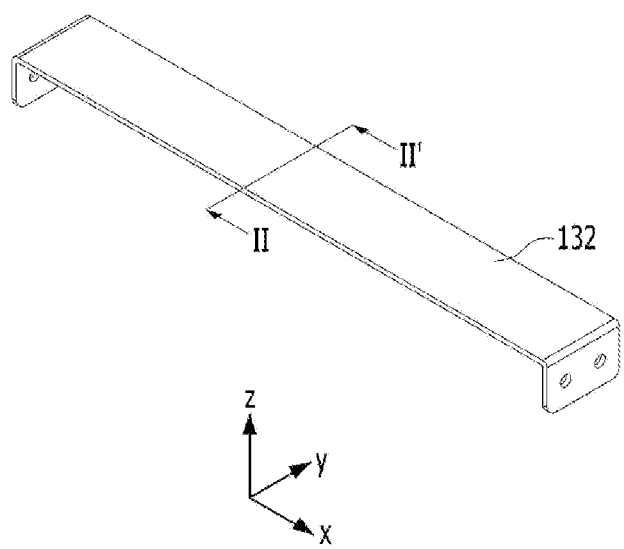
FIG. 5A is a perspective view of a clamping member included in a fuel cell according to a comparative example.
Figure 5B:
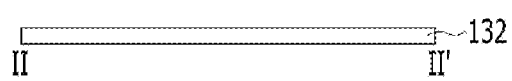
FIG. 5B is a cross-sectional view taken along line II-II' of the clamping member shown in FIG. 5A.
Figure 5B:
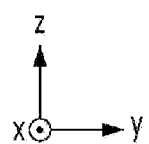

FIG. 5A is a perspective view of a clamping member 30 included in a fuel cell according to a comparative example, and FIG. 5B is a cross-sectional view taken along line II-II' of the clamping member 30 shown in FIG. 5A.

Unlike the clamping member 130 of the fuel cell 100 according to the exemplary embodiment described above, the clamping member 30 of the fuel cell according to the comparative example includes only a clamping body 132. Except therefor, it is assumed that the cell stack and the end plates of the fuel cell according to the comparative example are the same as the cell stack 122 and the first and second end plates 110A and 110B of the fuel cell 100 according to the exemplary embodiment of the present invention, respectively.

In the comparative example, since the clamping member 30 has only the clamping body 132, the length of the clamping member 30 of the comparative example is maintained constant, rather than varying depending on the temperature. Accordingly, in a high-temperature operation environment, in which the cell stack 122 operates at a high temperature, the internal pressure of the cell stack 122, in which a plurality of unit cells 122-1 to 122-N is repeatedly stacked on one another, i.e., the clamping surface pressure, excessively increases, thus deteriorating the durability of the fuel cell.

On the other hand, in the case of the fuel cell 100 according to the exemplary embodiment of the present invention, in a high-temperature operation environment, in which the cell stack 122 operates at a high temperature, the controller 160 controls the amount of heat generated by the clamping member 130 such that the length of the clamping member 130 increases to the same extent as the increase in the length of the reaction cell. As a result, in a high-temperature operation environment, the clamping surface pressure of the cell stack 122 does not increase excessively compared to the comparative example, in which the length of the clamping member 30 does not change and is fixed.

Figure 6:
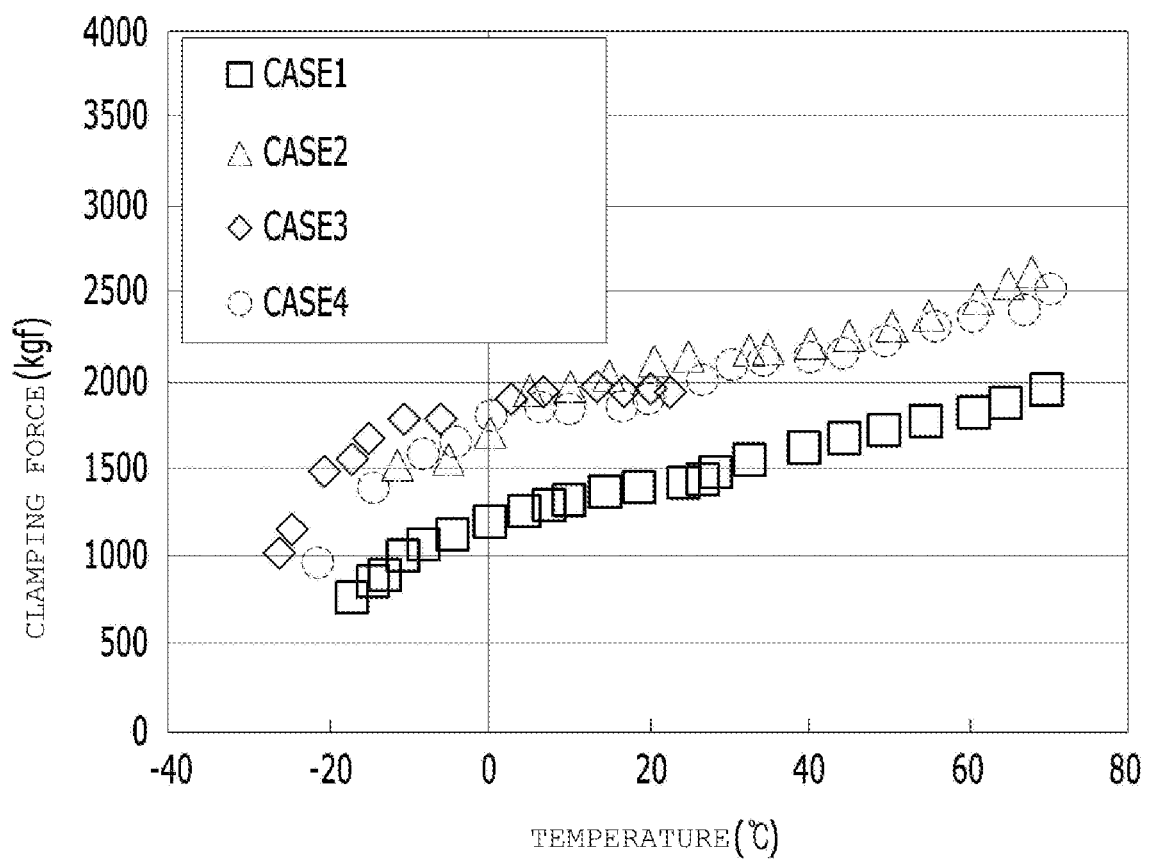
FIG. 6 is a graph showing a change in the clamping force according to a change in the temperature of a cell stack of the fuel cell according to the comparative example.

FIG. 6 is a graph showing a change in the clamping force according to a change in the temperature of the cell stack of the fuel cell according to the comparative example. In the graph, the horizontal axis denotes the temperature and the vertical axis denotes the clamping force. The graph of FIG. 6 shows the result obtained by combining the separators 242 and 244 and the gas diffusion layers 222 and 224, pressurizing the cell stack 122, and thereafter depressurizing the same.

In the comparative example, when the cell stack 122 is compressively clamped using the clamping member 30 in the state of applying a constant surface pressure to the cell stack 122 using a clamping press, the displacement in the stacking direction (e.g., the x-axis direction) of the cell stack 122 does not change. The in the instant state, a surface pressure change environment is made such that the internal surface pressure of the cell stack 122 is increased (i.e., the cell stack 122 is pressurized) and thereafter is reduced (i.e., the cell stack 122 is depressurized). The compression behavior of the cell stack 122 in the present surface pressure change environment is shown in FIG. 6.

Referring to FIG. 6, when the cell stack 122 is pressurized during operation at a high temperature and thereafter is cooled and depressurized, the surface pressure of the cell stack 122 is reduced due to the characteristics thereof in which the components are repeatedly disposed to form the plurality of unit cells 122-1 to 122-N stacked on one another. When the fuel cell according to the comparative example operates at a high temperature, excessive clamping surface pressure is applied to the cell stack 122, and thus the components of each unit cell 122-n included in the cell stack 122 are excessively compressed and are plastically deformed, i.e., the restoring force of the components is diminished. Subsequently, when the fuel cell according to the comparative example operates at a low temperature, the clamping force decreases due to the diminished restoring force of the components. As shown in FIG. 6, it may be seen in four comparative examples (CASE 1 to CASE 4) that the clamping force decreases when the cell stack 122 operates at a high temperature and thereafter operates at a low temperature.

As a result, the surface pressure of the reaction surfaces changes repeatedly and is ultimately reduced, and thus the internal resistance of the cell stack 122 increases, leading to deterioration in the stack performance of the fuel cell according to the comparative example.

However, in the case of the fuel cell 100 according to the exemplary embodiment of the present invention, when the cell stack 122 operates at a high temperature, the clamping member 130 thermally expands, and thus clamping surface pressure is not excessively applied to the unit cells 122-1 to 122-N of the cell stack 122. Accordingly, the components of the unit cells 122-1 to 122-N included in the cell stack 122 are prevented from being overcompressed and plastically deformed. Accordingly, since the restoring force of the components is not diminished, it is possible to prevent a reduction in the clamping force when the cell stack 122 operates at a high temperature and thereafter operates at a low temperature.

As a result, since the clamping force does not decrease, the components of each unit cell 122-n of the cell stack 122 of the fuel cell 100 according to the exemplary embodiment are prevented from being damaged in a room-temperature or low-temperature environment, exhibiting excellent airtightness performance.

Figure 7:
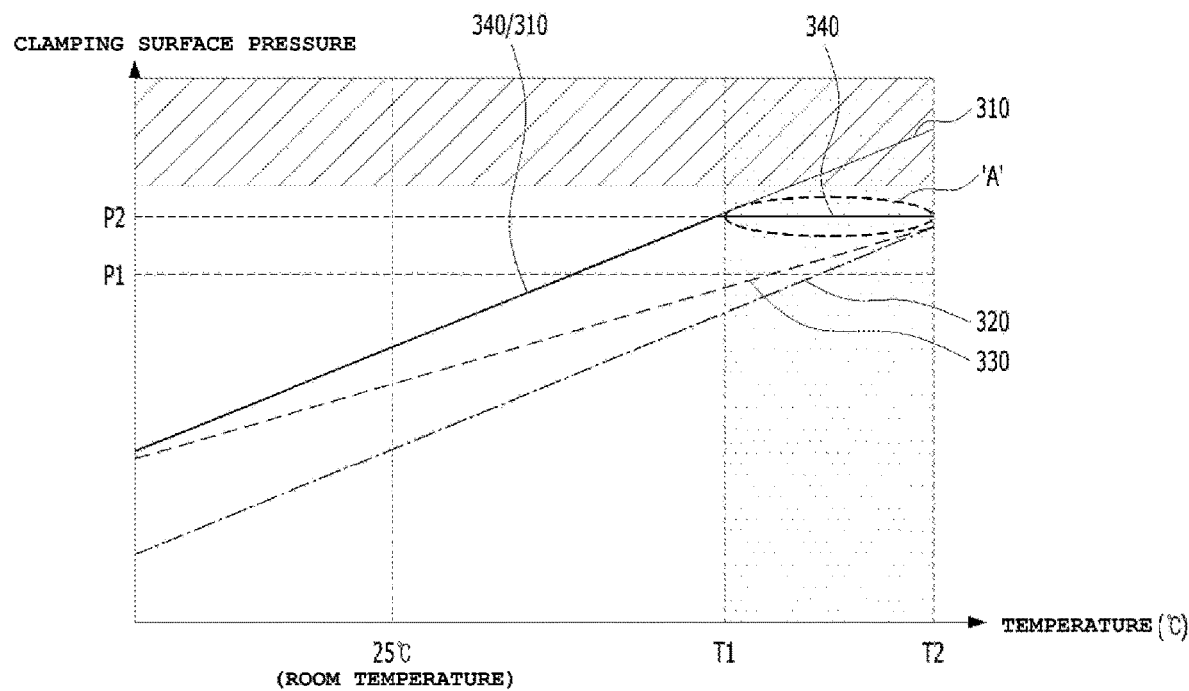
FIG. 7 is a graph showing a change in the clamping surface pressure according to a change in the temperature of the cell stack of the fuel cell according to the comparative example and the cell stack of the fuel cell according to the embodiment.

FIG. 7 is a graph showing a change in the clamping surface pressure according to a change in the temperature of the cell stack of the fuel cell according to the comparative example and the cell stack of the fuel cell according to the exemplary embodiment of the present invention. In the graph, the horizontal axis denotes the temperature and the vertical axis denotes the clamping surface pressure.

Referring to FIG. 7, in the case of the first comparative example 310, the clamping surface pressure within a temperature range T1 to T2, within which the cell stack 122 operates (hereinafter, referred to as a "stack operating temperature range"), falls outside of an appropriate clamping surface pressure range P1 to P2. For example, T1 may be 60° C., T2 may be 70° C., P1 may be 1 MPa, and P2 may be 1.5 MPa. Accordingly, since the components repeatedly stacked in the fuel cell according to the first comparative example 310 are exposed to excessive clamping surface pressure greater than P2, they may be plastically deformed.

In the case of the second comparative example 320, the initial clamping surface pressure is set to be relatively low to prevent the application of excessive clamping surface pressure to the cell stack 122 within the stack operating temperature range of T1 to T2. However, in the instant case, the clamping surface pressure within the stack operating temperature range T1 to T2 decreases below the appropriate clamping surface pressure range P1 to P2, and thus the performance of the cell stack 122 deteriorates.

In the case of the third comparative example 330, the application of excessive clamping surface pressure to the cell stack 122 within the stack operating temperature range T1 to T2 may be prevented, like the second comparative example 320. However, the clamping surface pressure is out of the appropriate clamping surface pressure range P1 to P2 in a specific section within the stack operating temperature range T1 to T2.

On the other hand, in the case of the fuel cell 100 according to the exemplary embodiment 340, when the clamping surface pressure increases excessively during operation of the cell stack 122 at a high temperature, the clamping body 132 thermally expands using the heat-generating portion 134 to the same extent as the increase in the length $L_C$ of the reaction cell, and thus the length $L_F$ of the clamping body 132 increases. As a result, the application of excessive clamping surface pressure to the cell stack 122 of the fuel cell 100 within the stack operating temperature range T1 to T2 may be prevented.

In conclusion, in the case of the fuel cell 100 according to the exemplary embodiment of the present invention, the clamping surface pressure of the cell stack 122 may be maintained within an appropriate clamping surface pressure range P1 to P2 (refer to "A" in FIG. 7) by controlling the amount of heat generated by the clamping member 130 through controlling the temperature of the clamping member 130 within the stack operating temperature range of the cell stack 122. Accordingly, the fuel cell 100 exhibits excellent performance such that the clamping surface pressure thereof is appropriately maintained within the range of P1 to P2 irrespective of a change in the temperature of the cell stack.

As is apparent from the above description, according to a fuel cell of the exemplary embodiment of the present invention, in a high-temperature operation environment, in which a cell stack operates at a high temperature, the length of a clamping member increases to the same extent as the increase in the length of a reaction cell. As a result, the fuel cell of the exemplary embodiment has excellent performance such that the clamping surface pressure of the cell stack does not excessively increase but is maintained within an appropriate range.

Furthermore, according to the fuel cell of the exemplary embodiment of the present invention, when the cell stack operates at a high temperature and thereafter operates at a low temperature, clamping force is not reduced, and thus the internal resistance of the cell stack does not increase, securing excellent stack performance and airtightness performance.

The above-described various embodiments may be combined with each other without departing from the object of the present invention unless being contrary to each other. Furthermore, for any element, which is not described in detail, of any of the various embodiments, refer to the description of the element having the same reference numeral of another exemplary embodiment of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fuel cell comprising:
   a cell stack including a plurality of unit cells stacked in a first direction;
   first and second end plates disposed at corresponding first and second end portions of the cell stack;
   at least one clamping member coupled to the first and second end plates to clamp the plurality of unit cells in the first direction, the at least one clamping member being configured to generate heat in a response to a control signal; and
   a controller configured to generate the control signal based on a temperature of the cell stack and to control an amount of heat generated by the at least one clamping member so that a length of the at least one clamping member increases to a same extent as an increase in a length of the cell stack.

2. The fuel cell according to claim 1, wherein the at least one clamping member includes:
   a clamping body;
   a heat-generating portion disposed to surround the clamping body; and
   a heat-insulating portion disposed to surround the heat-generating portion.

3. The fuel cell according to claim 2, wherein the clamping body includes a metallic material.

4. The fuel cell according to claim 3, wherein the metallic material includes at least one of steel, aluminum, copper, or magnesium.

5. The fuel cell according to claim 2, wherein the heat-generating portion is disposed between the first end plate and the second end plate in the first direction.

6. The fuel cell according to claim 2, wherein the heat-generating portion includes a surface-shaped or line-shaped resistance pattern.

7. The fuel cell according to claim 6, wherein an amount of heat generated by the resistance pattern decreases as a distance from the first and second end plates increases.

8. The fuel cell according to claim 7, wherein the amount of heat generated by the resistance pattern decreases linearly.

9. The fuel cell according to claim 7, wherein the amount of heat generated by the resistance pattern decreases non-linearly.

10. The fuel cell according to claim 9, wherein the heat-generating portion includes:
   a first heat-generating sector located at a central area of the cell stack in the first direction; and
   second heat-generating sectors located closer to the first and second end plates than the first heat-generating sector in the first direction,
   wherein an amount of heat generated by the second heat-generating sectors is greater than an amount of heat generated by the first heat-generating sector.

11. The fuel cell according to claim 2, wherein the heat-generating portion includes a metal-based material or a ceramic-based material.

12. The fuel cell according to claim 2, wherein the heat-generating portion has an electrical resistance of 50Ω to 100Ω.

13. The fuel cell according to claim 2, wherein an operating voltage of the cell stack is 250 V to 400 V and the heat-generating portion generates heat of 400 W to 1600 W.

14. The fuel cell according to claim 2, wherein the heat-generating portion includes:
   a heat-generating body located between the first and second end plates, the heat-generating body being configured to surround the clamping body; and
   first and second power connection portions disposed at corresponding first and second end portions of the heat-generating body, the first and second power connection portions being configured to be electrically connected to the control signal.

15. The fuel cell according to claim 2, wherein the heat-insulating portion includes at least one of polyimide, polypropylene, or urethane.

16. The fuel cell according to claim 2, further including a temperature sensor disposed between the clamping body and the heat-generating portion to detect a temperature of the heat-generating portion,
   wherein the controller is configured to generate the control signal using a temperature detected by the temperature sensor.

17. The fuel cell according to claim 2,
   wherein, when the temperature of the cell stack is equal to or greater than a predetermined temperature, the controller is configured to generate the control signal to satisfy a following equation:

$$\alpha_C \times (T_C - T_O) = L_C = \alpha_F \times (T_F - T_O) \times L_F$$

where $\alpha_C$ denotes a thermal expansion coefficient of the cell stack, $T_C$ denotes the temperature of the cell stack, $T_O$ denotes the predetermined temperature, $L_C$ denotes the length of the cell stack in the first direction, $\alpha_F$ denotes a thermal expansion coefficient of the clamping body, $T_F$ denotes a temperature of the clamping body, and $L_F$ denotes a length of the clamping body in the first direction.

18. The fuel cell according to claim 17, wherein the predetermined temperature is 60° C.

19. The fuel cell according to claim 2, wherein the at least one clamping member includes a plurality of clamping members spaced from each other in a second direction, the second direction intersecting the first direction, and
   wherein, an amount of heat generated by a clamping member disposed in a central area of the cell stack in the second direction when viewed in plan, among the plurality of clamping members, is greater than an amount of heat generated by a clamping member disposed in a peripheral area of the cell stack in the second direction among the plurality of clamping members.

* * * * *